United States Patent
Phillips et al.

[11] Patent Number: 5,120,356
[45] Date of Patent: Jun. 9, 1992

[54] ELECTRODEPOSITABLE COATING COMPOSITIONS

[75] Inventors: Emyr Phillips, Wakefield, England; Adalbert Braig, Weil-Friedlingen, Fed. Rep. of Germany

[73] Assignee: Ciba-Geigy Corporation, Ardsley, N.Y.

[21] Appl. No.: 641,848

[22] Filed: Jan. 16, 1991

Related U.S. Application Data

[63] Continuation-in-part of Ser. No. 541,236, Jun. 20, 1990, abandoned.

Foreign Application Priority Data

Jun. 28, 1989 [GB] United Kingdom ............... 8914862

[51] Int. Cl.$^5$ .................... C09K 3/00; C23F 11/14
[52] U.S. Cl. ................... 106/14.16; 106/14.15; 106/14.31; 106/14.37; 106/14.42; 252/390
[58] Field of Search .............. 106/14.15, 14.16, 14.31, 106/14.37, 14.42; 252/390

[56] References Cited

U.S. PATENT DOCUMENTS

| | | | |
|---|---|---|---|
| 3,077,454 | 2/1963 | Monroe et al. | 252/149 |
| 3,770,377 | 11/1963 | Scott et al. | 252/390 |
| 3,854,959 | 12/1974 | Costain et al. | 106/14.15 |
| 4,448,710 | 5/1984 | Hort et al. | 252/390 |
| 4,734,259 | 3/1988 | Frenier et al. | 252/8.555 |
| 4,762,627 | 8/1988 | Martinez et al. | 252/8.555 |
| 4,784,796 | 11/1988 | Treybig et al. | 106/14.13 |
| 4,837,323 | 6/1989 | Martinez et al. | 544/242 |

Primary Examiner—William R. Dixon, Jr.
Assistant Examiner—Anthony J. Green
Attorney, Agent, or Firm—JoAnn Villamizar

[57] ABSTRACT

The present invention provides an aqueous coating composition comprising:
a) an aqueous electrodepositable film-forming binder; and
b) as corrosion inhibitor, an effective amount of the reaction product of i) cinnamaldehyde and ii) an amine having the formula $R-(CH_2)_n-NH_2$ wherein R is $C_1-C_{12}$ alkyl, $C_6-C_{10}$ aryl, $C_5-C_8$ cycloalkyl or $-NH_2$, and n is 0 or an integer within the range of from 1 to 10.

12 Claims, No Drawings

ELECTRODEPOSITABLE COATING COMPOSITIONS

This application is a continuation-in-part of copending application Ser. No. 541,236, filed Jun. 20, 1990 abandoned.

The present invention relates to coating compositions, in particular to electrodepositable water-based coating compositions containing cinnamaldehyde/amine reaction products, as corrosion inhibitors.

Protection against corrosion is one of the most important functions of organic coating compositions for metal substrates. Many suggestions for improving the protection of coatings against corrosion are to be found in the literature, for example in H. Kittel, Lehrbuch der Lacke und Beschichtungen ("Textbook of Paints and Coatings"), volume V, Stuttgart 1977, 46–103.

On the one hand, the barrier function of the coating composition can be improved, in order to keep corrosive agents, such as oxygen, water and ions, away from the metal surface. On the other hand, it is possible to employ corrosion-inhibiting pigments which intervene chemically or electrochemically in the corrosion process, for example by the formation of insoluble deposits with corrosion products or by passivation (polarisation) of the metal surface. Metal chromates and lead compounds rank amongst the most effective corrosion-inhibiting pigments. Much use has been made of metal chromates, particularly because they inhibit both anodic and cathodic corrosion. Nowadays there are certain objections to the use of chromates owing to their potential carcinogenic action. Similarly, there are objections to the use of lead compounds owing to their chronic toxicity.

The twin factors of environment protection and of economy of natural resources are fundamental to any modern chemical manufacture. In the manufacture of surface coatings, these twin factors have influenced a trend away from expensive, hazardous and polluting hydrocarbon solvent-based surface coatings towards water-borne surface coatings, e.g. electrodepositable aqueous paints. Recently, there has been an increased commercial interest in the production of surface coatings by electrodeposition viz. the deposition of a film-forming material under the influence of an applied electrical potential. Various coating materials have been developed for this method of application, but the technique is often associated with various disadvantages. In particular, it is difficult to attain desired levels of corrosion inhibition using this method of applying surface coatings.

We have now found that certain cinnamaldehyde/amine reaction products impart excellent corrosive-inhibiting properties to aqueous-based electrodepositable coatings.

Accordingly, the present invention provides an aqueous electrodepositable coating composition comprising:
a) an aqueous film-forming binder; and
b) as corrosion inhibitor, an effective amount of the reaction product of i) cinnamaldehyde and ii) an amine having the formula R—(CH$_2$)$_n$NH$_2$ of the formula (I)

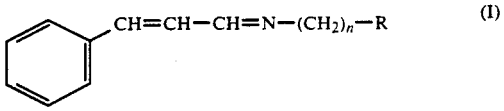

wherein R is C$_1$–C$_{12}$alkyl, C$_6$–C$_{10}$aryl, C$_5$–C$_8$cycloalkyl or —NH$_2$ and n is 0 or an integer within the range of from 1 to 10.

C$_1$–C$_{12}$alkyl substituents R include e.g. methyl, ethyl, propyl, isopropyl, n-butyl, isobutyl, t-butyl, pentyl, hexyl, octyl, nonyl, decyl, undecyl, and dodecyl substituents. C$_6$–C$_{10}$aryl substituents are preferably phenyl or naphthyl. C$_5$–C$_8$cycloalkyl is preferably cyclohexyl.

Preferred corrosion inhibitors b) are those derived from the reaction of cinnamaldehyde and amines R—(CH$_2$)$_n$—NH$_2$ in which R is —NH$_2$ and n is 2, 4 or 6, especially 6. A particularly preferred corrosion inhibitor b) is that derived from the reaction of cinnamaldehyde and hexamethylene diamine.

The use of cinnamaldehyde/amine reaction products as corrosion inhibitors is not new, having been disclosed in GB Patent Specification No. 1434354. GB 1434354 describes a method of inhibiting the corrosion of steel or aluminium by acidic compounds, comprising adding to the acidic compound, an azomethine; or by pre-treatment of the metal with the azomethine, either neat or as a solution in a solvent, or with its precursors; or by a combination of these methods.

Among a wide range of aldehyde precursors for the azomethine, cinnamaldehyde is merely one example set out in GB 1434354. There is no indication in GB 1434354 that amines of the type R—(CH$_2$)$_n$NH$_2$ wherein R and n have their previous significance, are in any way preferred precursors of the azomethines disclosed in GB 1434354.

The disclosure in GB 1434354 is generally concerned with protecting from corrosion, metals which are in contact with acidic media. Mention is also made that the azomethine may also be incorporated into coatings e.g. paints, waxes or polishes intended for application to steel which is subsequently to be exposed to acidic solutions. GB 1434354 makes no mention of aqueous-based paints, nor of surface-coated metal substrates which are not to be subsequently exposed to acidic solutions.

It is well established that compounds which are effective as corrosion inhibitors in one environment may not necessarily be used effectively in other environments. Thus, e.g., in "Peintures, Pigments et Vernis", 1963, 39, 295–303; chem. Abs. 59: 874e, it is disclosed that N-heterocycles such as pyrroles, which are known to be excellent corrosion inhibitors in acidic pickling baths, namely the primary use area described in GB 1434354, cause unacceptable yellowing of the coating when formed in linseed-based paint substrates. Moreover, corrosion inhibitors known to be effective in treatment of industrial water are usually ineffective in aqueous surface coatings.

Thus, due to their high water solubility, they may act as electrolytes in the coating leading to blistering and de-lamination of the coating.

There is no direct correlation, therefore, between corrosion inhibitor's effectivity in acidic media and paint media.

The corrosion inhibitors b) may be produced by the well-known reaction of aldehydes and amines to form a Schiffs' base, specifically by heating cinnamaldehyde and the amine R-(CH$_2$)$_n$NH$_2$, e.g. under reflux conditions in a water-entraining solvent, and continuously removing the water produced in the reaction.

As component a) of the electrodepositable aqueous coating compositions of the present invention, there may be used e.g. an epoxy resin optionally crosslinked with a capped or blocked organic polyisocyanate; acrylic resins optionally and preferably crosslinked with a capped or blocked isocyanate; adducts of epoxy resins with amines, polycarboxylic acids or their anhydrides or aminocarboxylic, mercaptocarboxylic or aminosulphonic acids; polyurethanes; polyesters; and reaction products of phenolic hydroxyl group-containing resins with an aldehyde and an amine or amino- or mercapto-carboxylic or aminosulphonic acid; as well as mixtures of these resins.

Suitable capped or blocked isocyanates include those in which the isocyanate groups have been reacted with a compound so that the resultant capped isocyanate is stable to hydroxyl or amine groups at room temperature, but is reactive with hydroxyl or amine groups at elevated temperatures e.g. from 100° to 300° C.

Any suitable organic polyisocyanate may be used in the production of the blocked organic polyisocyanate e.g. aliphatic compounds e.g. alkylene diisocyanates; aromatic compounds e.g. phenylene diisocyanates; or aliphatic-aromatic diisocyanates e.g. tolylene- or xylylene diisocyanates; triisocyanates e.g. triphenylmethane-4,4,4''-trisocyanate; and tetraisocyanate e.g. 4,4'-diphenyl-dimethylmethane-2,2'-,5,5'- tetraisocyanate.

Any suitable aliphatic, cycloaliphatic, aromatic, alkyl monoalcohol or phenolic compound may be used as a blocking agent in the production of the blocked isocyanates, e.g. methyl alcohol, phenylcarbinol or cresol.

Further details of suitable capped or blocked isocyanates, and their production are provided e.g. in U.S. Pat. No. 4,031,050.

Suitable acrylic resins include copolymers of at least one acrylic ester such as an alkyl or hydroxyalkyl acrylate or methacrylate with an ethylenically unsaturated monomer containing a salt-forming group, such as an acrylic monomer containing a carboxyl or an amino group and, optionally, another ethylenically unsaturated monomer.

Suitable epoxide resin adducts include those of diglycidyl ethers of dihydric alcohols or bisphenols with a primary or secondary amine, which may be a diamine such as ethylenediamine but is more usually a monoamine such as ethanolamine, 1-amino-2-propanol, diethanolamine or diethylamine, a polycarboxylic acid such as glutaric or adipic acid, a polycarboxylic acid anhydride such as maleic or succinic anhydride, an aminocarboxylic acid such as o-, m- or p-aminobenzoic acid or a mercaptocarboxylic acid. Suitable polyurethanes include adducts of hydroxyl-terminated polyurethanes with polycarboxylic acid anhydrides.

Suitable polyesters include carboxyl-terminated polyesters derived from polyhydric alcohols such as ethylene glycol, 1,2-propylene glycol, 1,3-propylene glycol or butane-1,4-diol with polycarboxylic acids such as glutaric, adipic, maleic, tetrahydrophthalic and phthalic acids or esterifying derivatives thereof.

Suitable reaction products of phenolic hydroxyl-containing resins include reaction products of phenol-terminated adducts of diglycidyl ethers with bisphenols, with aldehydes such as formaldehyde or benzaldehyde and amines such as ethanolamine, diethanolamine or ethylene diamine, aminocarboxylic acids such as glycine, sarcosine or aspartic acid, or mercaptocarboxylic acids such as thioglycolic or mercaptopropionic acid.

The electrodeposited resin film is preferably of an acrylic polymer or of an adduct of an epoxide resin with an amine.

Preferred isocyanate polymers include trimethylene, tetramethylene, m- and p- phenylene, 2,4- or 2,6-tolylene and 4,4- or 1,4-xylylene diisocyanates.

Preferred acrylic polymers include copolymers of at least one monoacrylic monomer containing a carboxyl group and at least one monoacrylic ester, optionally together with at least one other vinyl monomer. Suitable carboxyl-containing monoacrylic monomers from which the copolymers may be derived include acrylic acid, methacrylic acid and adducts of a hydroxyalkyl acrylate or methacrylate with a polycarboxylic acid anhydride. Acrylic and methacrylic acids are particularly preferred carboxyl-containing acrylic monomers.

Suitable monoacrylic esters from which the copolymers may be derived include methyl acrylate, ethyl acrylate, n-butyl acrylate, n-hexyl acrylate, 2-ethylhexyl acrylate and the corresponding methacrylates. Preferably at least one monoacrylic ester contains a reactive functional group such as an epoxide group, a primary or secondary amino group, a blocked isocyanate group, or, preferably, a hydroxyl group. Suitable monoacrylic esters having such reactive groups include 2-aminoethyl acrylate, 2-hydroxyethyl acrylate, 2-hydroxypropyl acrylate, 3-hydroxypropyl acrylate and the corresponding methacrylates, reaction products of 2-isocyanatoethyl acrylate or 2-isocyanatoethyl methacrylate with an isocyanate-blocking agent, for example as described in U.S. Pat. No. 3,542,739, or reaction products of a polyisocyanate, preferably a tolylene diisocyanate, with a hydroxyalkyl acrylate or methacrylate such as those hereinbefore described an an isocyanate-blocking agent, for example as described in U.S. Pat. No. 4,113,958. Isocyanate-blocking agents are well known and include alcohols, phenols, mercaptans, primary and secondary amines, oximes, triazoles, pyrazoles and lactams. Preferred such blocking agents are oximes and lactams. A particularly preferred reactive group-containing monoacrylic ester is 2-hydroxyethyl methacrylate.

The optional vinyl monomer which may be copolymerised with the carboxyl-containing acrylic monomer and the monoacrylic ester may be, for example, a vinyl ester such as vinyl acetate, a vinyl halide such as vinyl chloride or, preferably, a styrene, such as styrene itself, alpha-methylstyrene or p-chlorostyrene, styrene itself being particularly preferred.

Other preferred acrylic polymers include copolymers of at least one monoacrylic monomer containing a tertiary amine group and at least one monoacrylic ester having a reactive functional group, optionally together with at least one other vinyl monomer. Suitable monoacrylic monomers containing a tertiary amine group from which the copolymers may be derived include dialkylaminoalkyl acrylates and dialkylaminoalkyl methacrylates, preferably 2-(dimethylamino)ethyl acrylate, 2-(diethylamino)ethyl acrylate, 2-(dimethylamino)propyl acrylate and the corresponding methacrylates, 2-(dimethylamino)ethyl methacrylate being especially preferred. Reactive group-containing monoacrylic esters copolymerised with the tertiary amine-containing monoacrylic monomer may be acrylates or methacrylates containing an epoxide group, a blocked isocyanate group or, preferably a hydroxyl group, as hereinbefore described for the reaction group-containing monoacrylic esters copolymerised with the carboxyl-containing monoacrylic monomer.

The optional vinyl monomer which may be copolymerised with the tertiary amine group-containing monoacrylic monomer and the reactive group-containing monoacrylic ester may be, for example, an alkyl acrylate or methacrylate, such as methyl acrylate, ethyl acrylate, n-butyl acrylate, 2-ethylhexyl acrylate and the corresponding methacrylates, a vinyl ester such as vinyl acetate, a vinyl halide such as vinyl chloride or a styrene such as styrene, alpha-methyl styrene or p-chlorostyrene. Amongst these, the alkyl acrylates and methacrylates and styrene are preferred.

Particularly preferred acrylic polymers for use in the method of the invention are copolymers of (a) acrylic acid, methacrylic acid or 2-(dimethylamino)ethyl methacrylate with (b) a hydroxyalkyl acrylate or methacrylate and, optionally, (c) at least one further vinyl monomer, preferably selected from alkyl acrylates, alkyl methacrylates, styrene and mixtures of two or more thereof. The acrylates and methacrylates (b) and the alkyl acrylates and methacrylates for (c) are as hereinbefore described, with 2-hydroxyethyl methacrylate being particularly preferred as (b) and a mixture of styrene and 2-ethylhexyl acrylate being particularly preferred as (c).

The acrylic polymers may be prepared by conventional polymerisation processes using free radical polymerisation initiators such as peroxides or azo compounds, usually to give polymers having a number average molecular weight of 5000 or more, preferably 5000 to 50,000. Thus the monomers may be heated with the initiator in solution in an organic solvent, preferably a solvent which is miscible with the medium from which the polymer is to be electrodeposited. Conventional chain transfer agents such as tert.dodecyl mercaptan can be used when desired.

Preferred adducts of an epoxide resin with an amine are adducts of a polyglycidyl ether, which may be of a polyhydric phenol or a polyhydric alcohol, with a monoamine. Suitable polyglycidyl ethers include those of dihydric alcohols such as butane-1,4-diol, neopentyl glycol, hexamethylene glycol, oxyalkylene glycols and polyoxyalkylene glycols, and trihydric alcohols such as glycerol, 1,1,1-trimethylolpropane and adducts of these alcohols with ethylene oxide or propylene oxide. It will be understood by those skilled in the art that these polyglycidyl ethers of polyhydric alcohols are usually advanced, i.e. converted into longer chain higher molecular weight polyglycidyl ethers, for example by reaction with a dihydric alcohols or phenol, so that the resulting polyglycidyl ethers give adducts with suitable electrodepositable film-forming properties on reaction with the secondary monoamine. Preferred polyglycidyl ethers are those of polyhydric phenols, including bisphenols such as bisphenol F, bisphenol A and tetrabromobisphenol A and phenolic novolak resins such as phenol-formaldehyde or cresol-formaldehyde novolak resins. These polyglycidyl ethers of phenols may have been advanced, for example by reaction with dihydric alcohols or phenols such as those hereinbefore described. Particularly preferred polyglycidyl ethers are polyglycidyl ethers of bisphenol A advanced by reaction with bisphenol A.

Monoamines suitable for adduct formation with the polyglycidyl ethers include primary, secondary or tertiary amines. Secondary amines are preferred e.g. dialkylamines such as diethylamine, di-n-propylamine, di-isopropylamine, di-n-butylamine, di-n-octylamine and di-n-dodecylamine or nitrogen heterocycles such as piperidine or morpholine.

Preferred secondary monoamines are secondary alkanolamines such as diethanolamine, N-methylethanolamine, N-butylethanol-amine, diisopropanolamine, N-methylisopropanolamine or di-n-butanolamine. A particularly preferred secondary alkanolamine is diethanolamine.

Thus preferred adducts of polyglycidyl ether with a secondary monoamine are adducts of a polyglycidyl ether of a polyhydric phenol, which may have been advanced, with a secondary alkanolamine, while particularly preferred such adducts are those of a polyglycidyl ether of bisphenol A, advanced by reaction with bisphenol A, with diethanolamine.

Electrodeposition of the organic resin may be carried out using conventional procedures. Thus the electrodepositable resin, optionally together with conventional additives such as pigments, dyes, extenders, light stabilizers, antioxidants, further corrosion inhibitors, dispersing aids, curing catalysts, flow control agents, thixotropic agents, adhesion promoters, fillers and plasticizers, can be dissolved or dispersed in an aqueous medium, which may contain a minor amount of an organic solvent, together with an acid to at least partially neutralise salt-forming groups on the resin. The aqueous electrodeposition medium generally contains from 2 to 60%, preferably from 5 to 25%, by weight of the resin. The pigments can be organic, inorganic or metallic pigments, for example titanium dioxide, iron oxide, aluminum bronze, phthalocyanine blue etc. It is also possible to use concomitantly anti-corrosion pigments, for example pigments containing phosphates or borates, metal pigments and metal oxide pigments (see Farbe und Lack 88 (1982)), 183) or the pigments described in EP-A-54,267.

Examples of extenders which can be used concomitantly are talc, alumina, aluminum silicate, baryte, mica or silica. If desired, the corrosion inhibitor can be applied to a neutral carrier. Suitable carriers are, in particular, pulverulent extenders or pigments. This technique is described in greater detail in German Offenlegungsschrift 3,122,907.

In addition to the component b), the coating composition can also contain another organic, metal-organic or inorganic corrosion inhibitors, for example salts of nitroisophthalic acid, tannin, phosphoric esters, technical amines, substituted benztriazoles or substituted phenols, such as are described in German Offenlegungsschrift 3,146,265.

The corrosion inhibitor component b) may be added to the electrodepositable coating system during the preparation of the latter, for example, during the distribution of the pigment by grinding e.g. by the methods disclosed in EP 107089. Alternatively, the corrosion inhibitors can be incorporated into the non-emulsified resins and also into the grind resin. The corrosion inhibitors are preferably used in an amount of 0.01 to 20% by weight, preferably 0.05 to 5% by weight, based on the solids content of the electrodepositable coating composition.

Electrodeposition for only a few minutes, usually one minute, at a voltage of up to 500 volts is sufficient in most cases. Voltages as low as 2 volts may be used in some cases, especially if the size of the electrode on which the resin film is deposited is small in relation to the other electrode. For example, a cathodically depositable resin may be deposited on a small cathode in a tank where the whole of the tank is the anode, at voltages of 2 volts or 5 volts. Adhesion of the resin film may be improved if it is deposited in a stepwise, fashion first at a low voltage and then at a higher voltage. For example, a good coating can be obtained by electrodepositing the resin at 2 volts for 2 minutes, followed by deposition at 5 volts for up to 5 minutes. The coating compositions of the present invention may be applied to any electrically conductive substrate especially metals such as iron; steel; e.g. cold-rolled steel, optionally treated with zinc phosphate or galvanized; copper; zinc; and aluminum; more especially zinc or aluminum alloys.

After electrodeposition of the organic resin film, the substrate is rinsed in de-mineralized water, dried and baked at elevated temperatures e.g. up to 260° C.

The following Examples further illustrate the present invention.

EXAMPLE 1

Preparation of N,N'-Bis(3-phenyl-2-propenylidene)-1,6-hexane diamine

Cinnamaldehyde (198.2 g, 1.5 mole) is carefully added to a solution of 1,6-hexanediamine (87.2 g, 0.75 mole) in toluene (400 ml). Slight exotherm to 60° C. is observed. The resulting solution is heated at reflux until water (27 ml, 1.5 mole) is evolved. Evaporation of the solution gives 250.7 g of a brown viscous oil. $^1$H NMR: $\delta$ 1.0–2.85 (broad bands 8H); $\delta$ 3.6 (triplet 4 H); $\delta$ 6.82–8.22 (broad multiplete 16 H). Elemental analysis: Theory for $C_{24}H_{28}N_2$: C,83.72; H,8.14; N,8.14%. Found: C,83.61; H,8.35; N,8.05%.

EXAMPLE 2

Preparation of N-(3-phenyl-2-propenylidene) cyclohexylamine

Cinnamaldehyde (26.43 g, 0.2 mole) is carefully added to a solution of cyclohexylamine (19.84 g, 0.2 mole) in toluene (40 ml). A slight exotherm to 37° C. is observed.

The resulting solution is heated at reflux until water (3.6 ml) is evolved. Evaporation of the solution gives 39 g of a brown oil.

$^1$HNMR (CDCl$_3$): $\delta$ 0.85–2.2 (10H); $\delta$ 3.14 (1H); $\delta$ 6.90 (2H); $\delta$ 7.34 (5H); $\delta$ 8.08 (1H).

Elemental analysis: Theory for $C_{15}H_{19}N$: C, 84.5; H, 8.9; N, 6.6% Found: C, 83.1; H, 8.97; N, 6.98%.

EXAMPLE 3

Preparation of N-(3-phenyl-2-propenylidene)-1-butylamine)

Cinnamaldehyde (26.43 g, 0.2 mole) is carefully added to a solution of n-butylamine (14.63 g, 0.2 mole) in toluene (200 ml). A slight exotherm to 34° C. is observed.

The resulting solution is heated to reflux until water (3.6 ml) is evoved. Evaporation of the solution gives 36.5 g of a brown oil.

$^1$HNMR (CDCl$_3$): $\delta$ 0.5–1.83 (70H); $\delta$ 3.55 (2H); $\delta$ 6.98 (2H); $\delta$ 7.38 (5H); $\delta$ 8.14 (1H).

Elemental analysis: Theory for $C_{13}H_{17}N$: C, 83.42; H, 9.09; N, 7.49% Found: C, 81.2; H, 8.5; N, 7.1%.

EXAMPLE 4

Electrodip Coatings

A) Preparation of the electrodip bath 507.2 g of a two-component lacquer (35.5% solids) based on an amine-modified epoxide resin and a blocked diisocyanate are mixed with 3.5 g of propylene glycol monophenylether, 17.6 g of lactic acid, 3.5 g of a non-ionic detergent and 9 g of the corrosion inhibitors listed in the table. The mixture is homogenized by stirring and under rapid stirring 468 g water are slowly added in three portions. The resulting emulsion has a pH of 4.9 and a solids content of 18%. To 430 g of this emulsion are added 95 g of a gray pigment paste (containing carbonblack, titanium dioxide and aluminum silicate) under stirring. Finally 475 g of water are slowly added. This bath has a solids content of 20% and a pH of 5.2. The concentration of the corrosion inhibitor is 4 g/l or 2% related to the solids.

B) Electrodeposition

The coating is electrodeposited on cold-rolled steel plates (7.5×15 cm) which are zincphosphated by Chemphos ® 168 (Chemfil Corp.). The deposition is carried out at a temperature of 29° C. and a voltage of 200 V for 2 minutes. Afterwards the plates are rinsed with water, dried by an air-stream and baked 30 minutes a) at 176° C. and b) at 163° C. The resulting coatings have a thickness of about 25 mm.

C) Testing

The coating films are cutted with a Bonder 205 cutting device. The cut is 70×0.5 mm. The cutted plates are tested by a four weeks test according to General Motors Testing Method TM 54–56. This consists in the first week of a daily cycle of 15 minutes immersion in a 5% NaCl solution, 75 min storing at room temperature and 22.5 hours in a vapor chamber at 60° C. and 85% relative humidity. After 5 of those cycles (monday to friday) the samples are stored for 2 days (saturday and sunday) in the vapor chamber at 60° C./85 r.h.

The daily cycle in the second, third and fourth week is 1 hour dry storing at 60° C., 30 min storing at minus 23° C., 15 min. immersion in 5% NaCl solution, 75 min storing at room temperature and 21.5 hours in the vapor chamber at 60° C./85 % r.h. After 5 of those cycles (monday to friday) the samples are stored for 2 days (saturday and sunday) in the vapor chamber at 60° C./85 r.h.

After these 4 weeks testing the samples are rinsed with warm water and the parts of the lacquer which are not firmly adherent are scratched off. The breath of the corrodet zone is indicated in table 1.

TABLE 1

| Added corrosion inhibitor | Baking temperature | Breadth of the corroded zone (mm) |
| --- | --- | --- |
| none | 176° C. | 13 |
| 2% CI-1 | 176° C. | 0–1 |
| none | 163° C. | >35 |
| 2% CI-1 | 163° C. | 1–2 |

The same test was made using steel plates which were zincphosphated with Bonderite ® 925 (Parker Chem.Co.).

The results are given in table 2.

TABLE 2

| Added corrosion inhibitor | Baking temperature | Breadth of the corroded zone (mm) |
|---|---|---|
| none | 176° C. | 7 |
| 2% CI-1 | 176° C. | 0–1 |
| none | 163° C. | >25 |
| 2% CI-1 | 163° C. | 4 |

CI-1 = N-(3-Phenyl-2-propenylidene)cyclohexylamine

We claim:

1. An aqueous electrodepositable coating composition consisting essentially of: a) an aqueous film-forming binder; and b) an effective corrosion inhibiting amount of the reaction product of i) cinnamaldehyde and ii) an amine having the formula R—$(CH_2)_n$—$NH_2$, said reaction product having the formula (I)

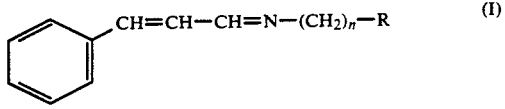

wherein R is $C_1$-$C_{12}$alkyl, $C_6$-$C_{10}$aryl, $C_5$-$C_8$cycloalkyl or —$NH_2$ and n is 0 or an integer within the range of from 1 to 10.

2. A composition according to claim 1 wherein in the formula R—$(CH_2)_n$—$NH_2$, R is —$NH_2$ and n is 2, 4 or 6.

3. A composition according to claim 2 wherein component b) is the reaction product of cinnamaldehyde and hexamethylene diamine.

4. A coating composition according to claim 1 wherein the binder is one or more water-soluble or water-dispersible synthetic resins.

5. A coating composition according to claim 4 wherein the resin is an epoxy resin optionally crosslinked with a capped or blocked organic polyisocyanate; an acrylic resin optionally crosslinked with a capped or blocked organic polisocyanate; an adduct of an epoxy resin with an amine, polycarboxylic acid or anhydride thereof, or aminocarboxylic acid, mercaptocarboxylic acid or aminosulphonic acid; a polyurethane; a polyester; a reaction product of a phenolic hydroxyl group-containing resin with an aldehyde and an amine, or amino- or mercapto-carboxylic acid or aminosulphonic acid; or a mixture of such resins.

6. A coating composition according to claim 1, containing, in addition to components a) and b), a pigment, a dye, an extender or other additives customary for coating compositions.

7. A coating composition according to claim 1, containing, besides the corrosion inhibitor b), one or more further corrosion inhibitors which can be organic, metalorganic or inorganic compounds.

8. A coating composition according to claim 1, containing 0.01 to 20% by weight, based on the weight of the weight of the film forming binder, of the component b).

9. A coating composition according to claim 8, containing 0.05 to 5% by weight, based on the weight of the weight of the film forming binder, of the component b).

10. A method for coating a metallic substrate comprising applying to the substrate, as a primer, a coating composition according to claim 1.

11. A method according to claim 10 wherein said metallic substrate is iron, steel, copper, zinc or aluminum.

12. A method according to claim 10, wherein said coating composition is applied by cathodic electrodeposition.